July 18, 1950        D. RODGERS        2,515,426
FISHING ROD SUPPORT
Filed Nov. 12, 1947
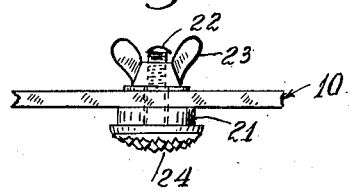
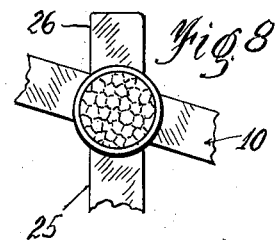
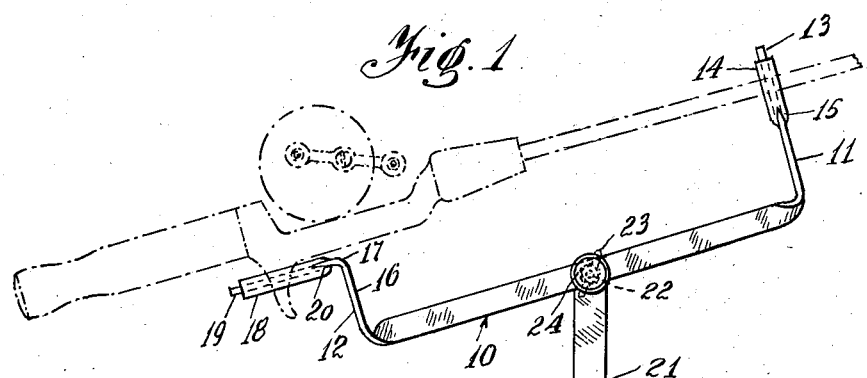
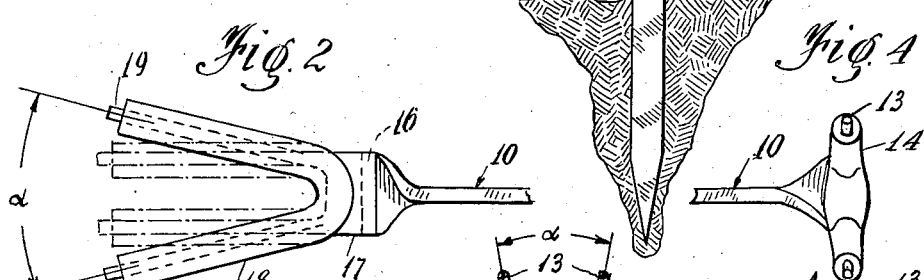
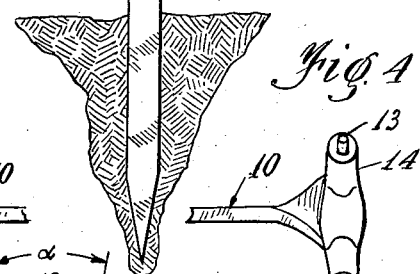
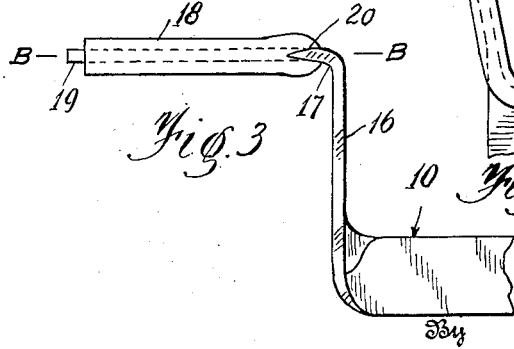
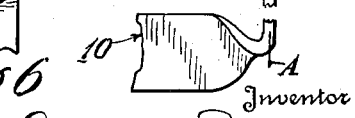
Inventor
Dominick Rodgers
By Ralph Donath
Attorney Patented July 18, 1950

2,515,426

UNITED STATES PATENT OFFICE 2,515,426

FISHING ROD SUPPORT

Dominick Rodgers, Pittsburgh, Pa.

Application November 12, 1947, Serial No. 785,329

1 Claim. (Cl. 248—42)

This invention relates to fishing rod supports for holding a fishing rod, having a reeling device thereon, in position while the baited line is in the water, but is not restricted to such rods alone.

One of the objects of my invention is to provide a fishing rod support that holds the fishing rod securely in position from which the rod can be quickly and conveniently placed and removed.

Another object of the invention is to provide a device of the character described in which the supported fishing rod can be set at any desired angle.

Still another object of the invention is to provide a device of the type set forth which can be easily and conveniently erected in the ground at the shore.

A further object of the invention is to provide a fishing rod support which is capable to hold any type of conventional fishing rod obtainable on the market.

Another object of the invention is to provide a fishing rod support which is foldable and can be conveniently carried and put away in a minimum of space.

Yet another object of the invention is to provide a fishing rod support which is simple in construction and inexpensive to manufacture.

Another object of the invention is to provide a fishing rod support which employs two terminal forks each covered by a single piece of resilient material of high frictional coefficient such as a soft rubber tube.

Another important object of the invention is to provide a fishing rod support with two rod engaging forks each covered with resilient tubing of high surface frictional coefficient which tubings, while in one piece, cannot be pulled off by virtue of the divergency of the legs of the fork.

Still another object of the invention is to provide a fishing rod support which is made from one piece of a twisted metallic bar, forked at both ends, and is fulcrumed on a stake adapted to be inserted into the ground.

To the accomplishment of these and such other objects as may hereafter appear the invention consists of the novel construction, combination and arrangement of parts herein specifically described and illustrated in the accompanying drawing, wherein are shown two preferred embodiments of the invention. However, it is to be understood that changes, variations and modifications may be resorted to which come within the scope of the claim hereunto appended.

In the drawing, wherein like numerals of reference designate same parts throughout the several views, Figure 1 is a side elevational view of the first preferred embodiment of the fishing rod support shown erected in the ground indicating the fishing rod held thereby in dot and dash lines.

Figure 2 is a partial plan view of the rear end of the saddle bar showing in full lines the rear fork covered with the resilient tubing and in dot and dash lines the split ends before spreading them apart to form the fork.

Figure 3 is a side elevational view of the rear portion of the saddle bar with its fork, shown in plan view in Figure 2.

Figure 4 is a fragmentary plan view of the saddle bar showing the finished front fork with its rubber tubing covering.

Figure 5 is a side elevational view of the front portion of the saddle bar, shown in Figure 4.

Figure 6 is a front elevational view of the front fork.

Figure 7 is a fragmentary plan view of the middle portion of the saddle bar showing the fulcrum arrangement between it and the stake bar.

Figure 8 is a fragmentary side elevational view of the middle portions of the saddle bar and of the stake bar of the second preferred embodiment of my invention showing the fulcrum arrangement between the saddle bar and stake bar, the latter protruding upwardly beyond the former.

Referring now to the drawing the saddle bar 10 has front upright 11 and rear upright 12 protruding substantially perpendicularly in the same direction therefrom. Front upright 11 is split at its end and bent apart to form substantially a V-shaped fork 13 in the plan of upright 11. The split ends, before bending them apart, are covered by a resilient tubing 14 made of material having a high frictional coefficient with metals, such as soft rubber, which tubing has a split or hole to permit the pulling of tubing 14 over the split ends before bending them apart. Thereafter the split ends are bent apart to form a V-shaped fork and the tubing is permanently fixed as it cannot be pulled off anymore in one piece over the diverging legs of the fork. The angle of divergence of the legs of the fork 13 (see Figure 6) is an acute angle sufficiently small so that the wedge action exercised by the fork upon the fishing reel rod is self locking. As best seen in Figure 5 the central plane A—A through the legs of front fork 13 is substantially perpendicular to the saddle bar 10.

At its rear end saddle bar 10 is provided with an upright 16 which has a terminal portion 17 that is bent at substantially 90 degrees outwardly and the end of which terminal portion is split and covered with soft rubber tubing 18 and subsequently spread apart to form a V-shaped fork 19 over which the tubing cannot be removed in one piece.

For the purpose of mounting tubing 18 on the split end portion, the tubing is provided at its middle portion with a hole or split 20. As to the angle of divergence of the legs of fork 19 (see Figure 2) the same limitation is placed as upon that of the fork 13. As best seen in Figure 3 the central plane B—B through the legs of rear fork 19 is substantially parallel to saddle bar 10.

Between the front upright 11 and rear upright 16 saddle bar 10 is oscillatably mounted on stake bar 21 by suitable connecting means, such as screw 22 locked by a suitable nut, such as a wing nut 23, shown. The head of the screw 22 may be provided with a light reflecting means such as a faceted or jewelled button 24.

Saddle bar 10 together with the uprights and fork portions may be made from one single bar by suitably bending and splitting it or otherwise fastened together of pieces. It is also evident that saddle bar 10 is not limited to the broad U-shape, as illustrated, but may have any selected configuration supporting the fork at its end.

Front fork 13 is adapted to receive for support a cylindrical part of the fishing rod while rear fork 18 is intended to receive and support the trigger shaped finger-hold forming part of every conventional fishing rod provided with a reeling device. For this purpose saddle bar 10 has sufficient length to space the front and rear uprights and forks, respectively, sufficiently distant to accommodate between them the reeled portion of any conventional fishing rod.

The device operates as follows:

Stake bar 21 is pushed or pounded into the ground and the saddle bar 10 is fulcrumed thereon by screw 22 and fixed in the desired position by tightening nut 23. The fishing pole is placed now upon the forks of the saddle bar 10 so that the trigger shaped portion of the fishing pole is wedged by a forward thrust into the rubber tubing 18 covering the rear fork 19 and the corresponding cylindrical portion of the fishing rod is wedged into the rubber tubing 14 covering the front fork 13. Suitable angular setting of the fishing rod may be obtained by loosening wing nut 23 and setting the fishing pole and saddle bar 10 in the desired angular position thereafter locking the wing nut 23.

The friction caused by the weight of the fishing pole and by the thrust force applied forwardly to wedge the trigger of the fishing rod into the rear fork, furthermore the friction provided by tightening nut 23, will prevent the pulling out or the tipping over of the fishing pole by any possible pull by the fish on the line.

The light reflecting button 24 has the purpose to amplify vibrations of the device caused by captured fish and to indicate it from a distance and even in the dark by reflecting the rays of a flash light directed thereon from time to time by the fisherman.

The second embodiment shown in Figure 8 is the same as the first, except that its stake bar 25 extends upwardly beyond the saddle bar 10 and provides an extension 26 at which the completely assembled device can be pounded into the ground by using a rock, club etc.

I claim:

A support for fishing rods of the type having a trigger shaped member on the handle comprising a stake bar adapted to be driven into the ground, a saddle bar pivotally mounted adjacent the top of the stake bar, one end of said saddle bar being turned upwardly from the body of the saddle bar, the opposite end of said saddle bar being turned upwardly and then rearwardly, each of said ends being split and spread apart to form a bifurcated engaging member, frictional engaging means on each of said bifurcated members adapted to engage the rod and trigger shaped member frictionally, and adjustable locking means at the pivotal mounting of the saddle bar and stake bar for maintaining their relative angular position.

DOMINICK RODGERS.

REFERENCES CITED

The following references are of record in the file of this patent:

UNITED STATES PATENTS

| Number | Name | Date |
|---|---|---|
| 1,275,928 | Huppertz | Aug. 13, 1918 |
| 2,176,352 | McHuron | Oct. 17, 1939 |
| 2,265,330 | Waddle et al. | Dec. 9, 1941 |
| 2,413,748 | Coffin | Jan. 7, 1947 |
| 2,430,112 | Hamre | Nov. 4, 1947 |